United States Patent
Kim et al.

(10) Patent No.: US 10,776,647 B2
(45) Date of Patent: *Sep. 15, 2020

(54) METHOD AND DEVICE FOR ATTENTION-DRIVEN RESOURCE ALLOCATION BY USING AVM TO THEREBY ACHIEVE SAFETY OF AUTONOMOUS DRIVING

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/732,053

(22) Filed: Dec. 31, 2019

(65) Prior Publication Data

US 2020/0250450 A1 Aug. 6, 2020

Related U.S. Application Data

(60) Provisional application No. 62/799,307, filed on Jan. 31, 2019.

(51) Int. Cl.
*G06K 9/00* (2006.01)
*G06K 9/62* (2006.01)
(Continued)

(52) U.S. Cl.
CPC ....... *G06K 9/00973* (2013.01); *G05D 1/0238* (2013.01); *G06K 9/2054* (2013.01);
(Continued)

(58) Field of Classification Search
CPC ............. G06K 9/00973; G06K 9/2054; G06K 9/3233; G06K 9/6228; G05D 1/0238; G06N 3/08
See application file for complete search history.

(56) References Cited

U.S. PATENT DOCUMENTS

2017/0206431 A1* 7/2017 Sun .................. G06N 3/084
2018/0068198 A1* 3/2018 Savvides ............ G06K 9/6274
(Continued)

*Primary Examiner* — John B Strege
(74) *Attorney, Agent, or Firm* — Kaplan Breyer Schwarz, LLP

(57) ABSTRACT

A method for achieving better performance in an autonomous driving while saving computing powers, by using confidence scores representing a credibility of an object detection which is generated in parallel with an object detection process is provided. And the method includes steps of: (a) a computing device acquiring at least one circumstance image on surroundings of a subject vehicle, through at least one panorama view sensor installed on the subject vehicle; (b) the computing device instructing a Convolutional Neural Network (CNN) to apply at least one CNN operation to the circumstance image, to thereby generate initial object information and initial confidence information on the circumstance image; and (c) the computing device generating final object information on the circumstance image by referring to the initial object information and the initial confidence information.

28 Claims, 5 Drawing Sheets

(51) Int. Cl.
*G06N 3/08* (2006.01)
*G06K 9/32* (2006.01)
*G05D 1/02* (2020.01)
*G06K 9/20* (2006.01)

(52) U.S. Cl.
CPC ......... *G06K 9/3233* (2013.01); *G06K 9/6228* (2013.01); *G06N 3/08* (2013.01)

(56) References Cited

U.S. PATENT DOCUMENTS

| | | | |
|---|---|---|---|
| 2018/0089505 A1* | 3/2018 | El-Khamy | G06K 9/6256 |
| 2018/0129974 A1* | 5/2018 | Giering | G06N 5/022 |
| 2018/0267558 A1* | 9/2018 | Tiwari | G05D 1/0246 |
| 2018/0268292 A1* | 9/2018 | Choi | G06K 9/66 |
| 2019/0258878 A1* | 8/2019 | Koivisto | G05D 1/0246 |
| 2019/0354782 A1* | 11/2019 | Kee | G06N 3/02 |

* cited by examiner

US 10,776,647 B2

METHOD AND DEVICE FOR ATTENTION-DRIVEN RESOURCE ALLOCATION BY USING AVM TO THEREBY ACHIEVE SAFETY OF AUTONOMOUS DRIVING

CROSS REFERENCE OF RELATED APPLICATION

This present application claims the benefit of the earlier filing date of provisional patent application No. 62/799,307, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for a resource allocation to thereby achieve safety of autonomous driving.

BACKGROUND OF THE DISCLOSURE

Recently, an autonomous driving technology has been studied, so that an autonomous vehicle could be driven with a fairly high accuracy without an intervention of a driver. However, such autonomous driving technology has not been commercialized. There may be many reasons why the autonomous driving technology is not used by the public, but one of them is that operations for the autonomous driving require too much computing powers.

There has been many efforts to reduce a consumption of the computing powers required for the autonomous driving, but the problem caused by this kind of approach is that if the computing powers are reduced, performance of the autonomous driving is dropped. If the performance of the autonomous driving is dropped, it will cause a lot of errors, resulting in threatening a driver and people around the driver. Thus, the performance of the autonomous driving should be maintained while reducing the computing powers. But it has not been studied much.

SUMMARY OF THE DISCLOSURE

It is an object of the present disclosure to solve all the aforementioned problems.

It is an object of the present disclosure to provide a method for an attention-driven resource allocation by using an AVM to thereby achieve a safety of an autonomous driving.

It is another object of the present disclosure to provide a method for generating confidence scores, which are parameters representing a credibility of an object detection, in parallel with a process of the object detection.

It is still another object of the present disclosure to provide a method for performing more accurate object detection by repeating the object detection on regions whose confidence scores are smaller than a threshold.

In accordance with one aspect of the present disclosure, there is provided a method for achieving better performance in an autonomous driving while saving computing powers, by using confidence scores representing a credibility of an object detection which is generated in parallel with an object detection process, including steps of: (a) a computing device acquiring at least one circumstance image on surroundings of a subject vehicle, through at least one panorama view sensor installed on the subject vehicle; (b) the computing device instructing a Convolutional Neural Network (CNN) to apply at least one CNN operation to the circumstance image, to thereby generate initial object information and initial confidence information on the circumstance image; and (c) the computing device generating final object information on the circumstance image by referring to the initial object information and the initial confidence information.

As one example, the step of (c) further includes steps of: (c1) the computing device performing a re-detection process of (i) first selecting each of one or more first specific regions, among one or more regions in the circumstance image, whose corresponding confidence score is smaller than a threshold, by referring to the initial confidence information and (ii) then instructing the CNN to apply the CNN operation to the first specific regions, to thereby generate first adjusted object information and first adjusted confidence information on the circumstance image; (c2) the computing device iteratively performing the re-detection process, by (i) selecting each of one or more K-th specific regions, among the regions in the circumstance image, whose corresponding confidence score is smaller than the threshold, by referring to (K−1)-th adjusted confidence information generated beforehand and (ii) then instructing the CNN to apply the CNN operation to the K-th specific regions, to thereby generate K-th adjusted object information and K-th adjusted confidence information on the circumstance image; and (c3) the computing device, if the re-detection process is performed N times so that N-th adjusted object information and N-th adjusted confidence information are generated, generating the final object information by referring to the initial object information and at least part of the first adjusted object information to the N-th adjusted object information, and wherein K is an integer from 2 to N, and N is a prescribed integer.

As one example, the computing device, if a sum of one or more areas of one or more M-th specific regions, which have been selected when an M-th re-detection process has been performed, is smaller than a threshold, stops iteratively performing the re-detection process, and generates the final object information by referring to the initial object information and at least part of the first adjusted object information to (M−1)-th adjusted object information, wherein M is an integer from 1 to N−1.

As one example, the computing device, if one or more L-th specific regions are selected while an L-th re-detection process has been performed, generates L-th specific upsampled images by applying at least one upsampling operation to the L-th specific regions by referring to L-th magnification information, and instructs the CNN to apply the CNN operation to the L-th specific upsampled images, to thereby generate L-th adjusted object information and L-th adjusted confidence information, wherein L is an integer from 1 to N.

As one example, the computing device performs at least one of an Non-Maximum Suppression algorithm and a Box Voting algorithm by referring to the initial object information and at least part of the first adjusted object information and the N-th adjusted object information, to thereby generate the final object information.

As one example, at the step of (c), the computing device, while generating an integrated image including a plurality of circumstance images as its partial images, generates integrated final object information on the integrated image by using each of pieces of initial object information and each of pieces of initial confidence information on each of the circumstance images, wherein the integrated final object information is generated by performing following steps of:

(c4) the computing device performing a re-detection process of (i) generating first integrated confidence information on the integrated image by referring to said each of pieces of the initial confidence information, (ii) then selecting each of one or more first specific regions, among one or more regions in the integrated image, whose corresponding confidence score is smaller than a threshold, by referring to the first integrated confidence information, (iii) and finally instructing the CNN to apply the CNN operation to the first specific regions, to thereby generate each of pieces of first adjusted object information and each of pieces of first adjusted confidence information on the integrated image; (c5) the computing device iteratively performing the re-detection process, by (i) generating K-th adjusted integrated confidence information on the integrated image by referring to each of pieces of (K−1)-th adjusted confidence information, (ii) then selecting each of one or more K-th specific regions, among the regions in the integrated image, whose corresponding confidence score is smaller than the threshold, by referring to the K-th adjusted integrated confidence information, (iii) and finally instructing the CNN to apply the CNN operation to the K-th specific regions, to thereby generate each of pieces of K-th adjusted object information and each of pieces of K-th adjusted confidence information on the integrated image; and (c6) the computing device, if the re-detection process is performed N times so that each of pieces of N-th adjusted object information and each of pieces of N-th adjusted confidence information are generated, generating the integrated final object information by referring to the initial object information and at least part of the first adjusted object information to the N-th adjusted object information, and wherein K is an integer from 2 to N, and N is a prescribed integer.

As one example, (i) on condition that one or more first circumstance images are acquired through one or more first panorama view sensors, among a plurality of panorama view sensors, corresponding to a camera, the computing device instructs a first CNN, which is optimized to a 3-channel image and whose number of input nodes is larger than or same as 3, to apply at least one first CNN operation to the first circumstance images, and (ii) on condition that one or more second circumstance images are acquired through one or more second panorama view sensors corresponding to a depth sensor, the computing device instructs a second CNN, which is optimized to a depth image and whose number of input nodes is larger than or same as 1, to apply at least one second CNN operation to the second circumstance images.

As one example, the method further includes a step of: (d) the computing device delivering the final object information to an autonomous driving module, to thereby support the autonomous driving module to perform an autonomous driving of the subject vehicle by using the final object information.

As one example, before the step of (a), the method further includes steps of: (a1) a learning device, if a training image is acquired, instructing at least one convolutional layer included in the CNN to generate at least one convolutional feature map by applying at least one convolutional operation to the training image; (a2) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (a3) the learning device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (a4) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

As one example, at the step of (a4), the learning device instructs the loss layer to generate the RPN loss by using a following formula:

$$L_{RPN}(\{p_i\}, \{t_i\}) = \frac{1}{N_{cls}}$$

$$\left( \sum_{i:p_i^* = I(p_i > 0.5)} (1.1 - c_i) L_{cls}(p_i, p_i^*) + \sum_{i:p_i^* \neq I(p_i > 0.5)} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding to the i-th pixel, $t_i$ denotes an i-th estimated RPN regression result corresponding to the i-th pixel, and $t_i^*$ denotes an i-th GT RPN regression result corresponding to the i-th pixel, and wherein, the i-th GT RPN classification result and the i-th GT RPN regression result correspond to the GT object detection result.

As one example, at the step of (a4), the learning device instructs the loss layer to generate the CNN loss by using a following formula:

$$L_{CNN}(\{p_i\}, \{t_i\}) =$$

$$\frac{1}{N_{cls}} \left( \sum_{i:p_i^* = I(p_i = \text{largest score among class scores})} (1.1 - c_i) L_{cls}(p_i, p_i^*) + \sum_{i:p_i^* \neq I(p_i = \text{largest score among class scores})} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein N, and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding to the i-th pixel, $t_i$ denotes an i-th estimated CNN regression result corresponding to the i-th estimated ROI, and $t_i^*$ denotes an i-th GT CNN regression result corresponding to the i-th pixel, and wherein the i-th estimated CNN classification result and the i-th estimated CNN regression result correspond to the estimated object detection result.

As one example, after the step of (a3), the learning device instructs a confidence layer to generate an integrated confidence map including information on each of integrated confidence scores for each of pixels in the training image by referring to the RPN confidence map and the CNN confidence map.

As one example, the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

As one example, the learning device instructs the confidence layer to generate an (X_Y)-th integrated confidence score, corresponding to a coordinate (x,y) on the training image, among the integrated confidence scores, by using a following formula:

$$c'_{xy} = \max\left(c_{xy}, \max_{r_i : (x,y) \in r_i} c_{r_i}\right)$$

wherein $c_{xy}'$ denotes the (X_Y)-th integrated confidence score, $c_{xy}$ denotes an (X_Y)-th resized RPN confidence score corresponding to a coordinate (x,y) on the resized RPN confidence map, and $c_{r_i}$ denotes an i-th CNN confidence score for an i-th estimated ROI, denoted as $r_i$, including the coordinate (x,y), which has been determined in the NMS result.

As one example, the step of (b) further includes steps of:

(b1) the computing device, if the circumstance image is acquired, instructing at least one convolutional layer included in the CNN to generate at least one convolutional feature map by applying at least one convolutional operation to the circumstance image; (b2) the computing device, during a process of generating estimated Regions-Of-Interest (ROIs) on the circumstance image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (b3) the computing device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (b4) the computing device instructing a confidence layer interworking with the CNN to generate an integrated confidence map by referring to the RPN confidence map and the CNN confidence map, wherein the computing device instructs the CNN to output the initial object information including the estimated object detection result and the initial confidence information including the integrated confidence map.

In accordance with another aspect of the present disclosure, there is provided a computing device for achieving better performance in an autonomous driving while saving computing powers, by using confidence scores representing a credibility of an object detection which is generated in parallel with an object detection process, including: at least one memory that stores instructions; and at least one processor configured to execute the instructions to perform processes of: (I) acquiring at least one circumstance image on surroundings of a subject vehicle, through at least one panorama view sensor installed on the subject vehicle; (II) instructing a Convolutional Neural Network (CNN) to apply at least one CNN operation to the circumstance image, to thereby generate initial object information and initial confidence information on the circumstance image; and (III) generating final object information on the circumstance image by referring to the initial object information and the initial confidence information.

As one example, the process of (III) further includes processes of: (III1) performing a re-detection process of (i) first selecting each of one or more first specific regions, among one or more regions in the circumstance image, whose corresponding confidence score is smaller than a threshold, by referring to the initial confidence information and (ii) then instructing the CNN to apply the CNN operation to the first specific regions, to thereby generate first adjusted object information and first adjusted confidence information on the circumstance image; (III2) iteratively performing the re-detection process, by (i) selecting each of one or more K-th specific regions, among the regions in the circumstance image, whose corresponding confidence score is smaller than the threshold, by referring to (K−1)-th adjusted confidence information generated beforehand and (ii) then instructing the CNN to apply the CNN operation to the K-th specific regions, to thereby generate K-th adjusted object information and K-th adjusted confidence information on the circumstance image; and (III3) if the re-detection process is performed N times so that N-th adjusted object information and N-th adjusted confidence information are generated, generating the final object information by referring to the initial object information and at least part of the first adjusted object information to the N-th adjusted object information, and wherein K is an integer from 2 to N, and N is a prescribed integer.

As one example, the processor, if a sum of one or more areas of one or more M-th specific regions, which have been selected when an M-th re-detection process has been performed, is smaller than a threshold, stops iteratively performing the re-detection process, and generates the final object information by referring to the initial object information and at least part of the first adjusted object information to (M−1)-th adjusted object information, wherein M is an integer from 1 to N−1.

As one example, the processor, if one or more L-th specific regions are selected while an L-th re-detection process has been performed, generates L-th specific upsampled images by applying at least one upsampling operation to the L-th specific regions by referring to L-th magnification information, and instructs the CNN to apply the CNN operation to the L-th specific upsampled images, to thereby generate L-th adjusted object information and L-th adjusted confidence information, wherein L is an integer from 1 to N.

As one example, the processor performs at least one of an Non-Maximum Suppression algorithm and a Box Voting algorithm by referring to the initial object information and at least part of the first adjusted object information and the N-th adjusted object information, to thereby generate the final object information.

As one example, at the process of (III), the processor, while generating an integrated image including a plurality of circumstance images as its partial images, generates integrated final object information on the integrated image by using each of pieces of initial object information and each of pieces of initial confidence information on each of the circumstance images, wherein the integrated final object information is generated by performing following processes of: (III4) performing a re-detection process of (i) generating first integrated confidence information on the integrated image by referring to said each of pieces of the initial confidence information, (ii) then selecting each of one or more first specific regions, among one or more regions in the integrated image, whose corresponding confidence score is smaller than a threshold, by referring to the first integrated confidence information, (iii) and finally instructing the CNN to apply the CNN operation to the first specific regions, to thereby generate each of pieces of first adjusted object information and each of pieces of first adjusted confidence information on the integrated image; (III5) iteratively performing the re-detection process, by (i) generating K-th adjusted integrated confidence information on the integrated image by referring to each of pieces of (K−1)-th adjusted confidence information, (ii) then selecting each of one or more K-th specific regions, among the regions in the integrated image, whose corresponding confidence score is smaller than the threshold, by referring to the K-th adjusted integrated confidence information, (iii) and finally instructing the CNN to apply the CNN operation to the K-th specific regions, to thereby generate each of pieces of K-th adjusted object information and each of pieces of K-th adjusted confidence information on the integrated image; and (III6) if the re-detection process is performed N times so that each of pieces of N-th adjusted object information and each of pieces of N-th adjusted confidence information are generated, generating the integrated final object information by referring to the initial object information and at least part of the first adjusted object information to the N-th adjusted object information, and wherein K is an integer from 2 to N, and N is a prescribed integer.

As one example, (i) on condition that one or more first circumstance images are acquired through one or more first panorama view sensors, among a plurality of panorama view sensors, corresponding to a camera, the processor instructs a first CNN, which is optimized to a 3-channel image and whose number of input nodes is larger than or same as 3, to apply at least one first CNN operation to the first circumstance images, and (ii) on condition that one or more second circumstance images are acquired through one or more second panorama view sensors corresponding to a depth sensor, the processor instructs a second CNN, which is optimized to a depth image and whose number of input nodes is larger than or same as 1, to apply at least one second CNN operation to the second circumstance images.

As one example, the processor further performs a process of: (IV) delivering the final object information to an autonomous driving module, to thereby support the autonomous driving module to perform an autonomous driving of the subject vehicle by using the final object information.

As one example, before the process of (I), the CNN is trained by performing processes of: (I1) a learning device, if a training image is acquired, instructing at least one convolutional layer included in the CNN to generate at least one convolutional feature map by applying at least one convolutional operation to the training image; (I2) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (I3) the learning device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (I4) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

As one example, at the process of (I4), the learning device instructs the loss layer to generate the RPN loss by using a following formula:

$$L_{RPN}(\{p_i\}, \{t_i\}) = \frac{1}{N_{cls}} \left( \sum_{i: p_i^* = I(p_i > 0.5)} (1.1 - c_i) L_{cls}(p_i, p_i^*) + \sum_{i: p_i^* \neq I(p_i > 0.5)} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding to the i-th pixel, $t_i$ denotes an i-th estimated RPN regression result corresponding to the i-th pixel, and $t_i^*$ denotes an i-th GT RPN regression result corresponding to the i-th pixel, and wherein, the i-th GT RPN classification result and the i-th GT RPN regression result correspond to the GT object detection result.

As one example, at the process of (I4), the learning device instructs the loss layer to generate the CNN loss by using a following formula:

$$L_{CNN}(\{p_i\}, \{t_i\}) = \frac{1}{N_{cls}} \left( \sum_{i:p_i^* = I(p_i = \text{largest score among class scores})} (1.1 - c_i) L_{cls}(p_i, p_i^*) + \sum_{i:p_i^* \neq I(p_i = \text{largest score among class scores})} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding to the i-th pixel, $t_i$ denotes an i-th estimated CNN regression result corresponding to the i-th estimated ROI, and $t_i^*$ denotes an i-th GT CNN regression result corresponding to the i-th pixel, and wherein the i-th estimated CNN classification result and the i-th estimated CNN regression result correspond to the estimated object detection result.

As one example, after the process of (I3), the learning device instructs a confidence layer to generate an integrated confidence map including information on each of integrated confidence scores for each of pixels in the training image by referring to the RPN confidence map and the CNN confidence map.

As one example, the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

As one example, the learning device instructs the confidence layer to generate an (X_Y)-th integrated confidence score, corresponding to a coordinate (x,y) on the training image, among the integrated confidence scores, by using a following formula:

$$c'_{xy} = \max\left(c_{xy}, \max_{r_i:(x,y) \in r_i} c_{r_i}\right)$$

wherein $c_{xy}'$ denotes the (X_Y)-th integrated confidence score, $c_{xy}$ denotes an (X_Y)-th resized RPN confidence score corresponding to a coordinate (x,y) on the resized RPN confidence map, and $c_{r_i}$ denotes an i-th CNN confidence score for an i-th estimated ROI, denoted as $r_i$, including the coordinate (x,y), which has been determined in the NMS result.

As one example, the process of (II) further includes processes of: (II1) if the circumstance image is acquired, instructing at least one convolutional layer included in the CNN to generate at least one convolutional feature map by applying at least one convolutional operation to the circumstance image; (II2) during a process of generating estimated Regions-Of-Interest (ROIs) on the circumstance image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores; (II3) if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (II4) instructing a confidence layer interworking with the CNN to generate an integrated confidence map by referring to the RPN confidence map and the CNN confidence map, wherein the processor instructs the CNN to output the initial object information including the estimated object detection result and the initial confidence information including the integrated confidence map.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
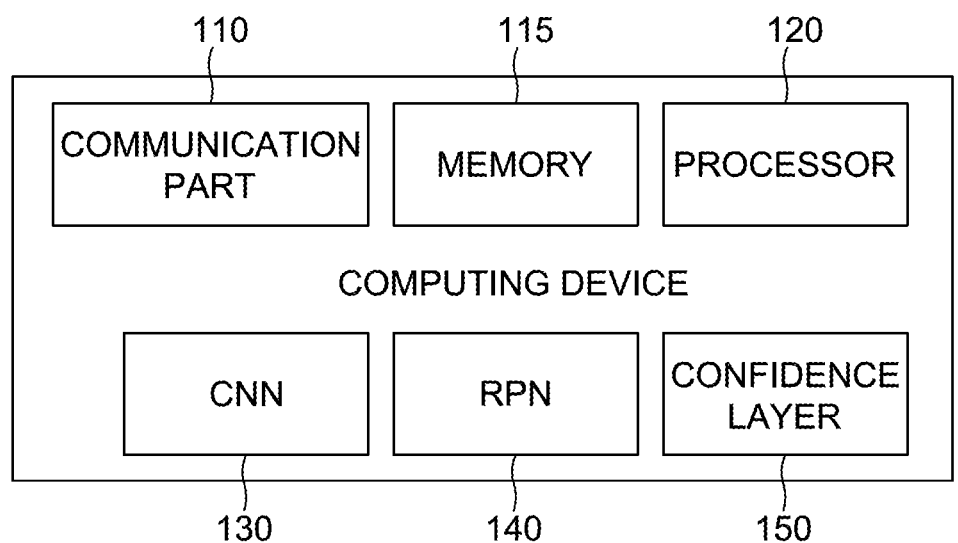
FIG. 1 is a drawing schematically illustrating a configuration of a computing device performing a method for achieving better performance in an autonomous driving while saving computing powers, by using confidence scores representing a credibility of an object detection which is generated in parallel with an object detection process in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a computing device performing a method for achieving better performance in an autonomous driving while saving computing powers, by using confidence scores representing a credibility of an object detection which is generated in parallel with an object detection process in accordance with one example embodiment of the present disclosure.

By referring to FIG. 1, the computing device 100 may include a Convolutional Neural Network (CNN) 130, a Region Proposal Network (RPN) 140 and a confidence layer 150 to be described later. Processes of input/output and computations of the CNN 130, the RPN 140 and the confidence layer 150 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

The computing device 100 may interwork with a subject vehicle, and may acquire images photographed by at least one panorama sensor installed on the subject vehicle. Such panorama view sensor may be built as a camera or a depth sensor, i.e., a radar or a Lidar.

So far the configuration of the computing device 100 to be used for performing the method for achieving the better performance in the autonomous driving while saving the computing powers, by using the confidence scores representing the credibility of the object detection which is generated in parallel with the object detection process in accordance with one example embodiment of the present disclosure has been explained. Below, the method itself will be explained by referring to FIG. 2.

Figure 2:
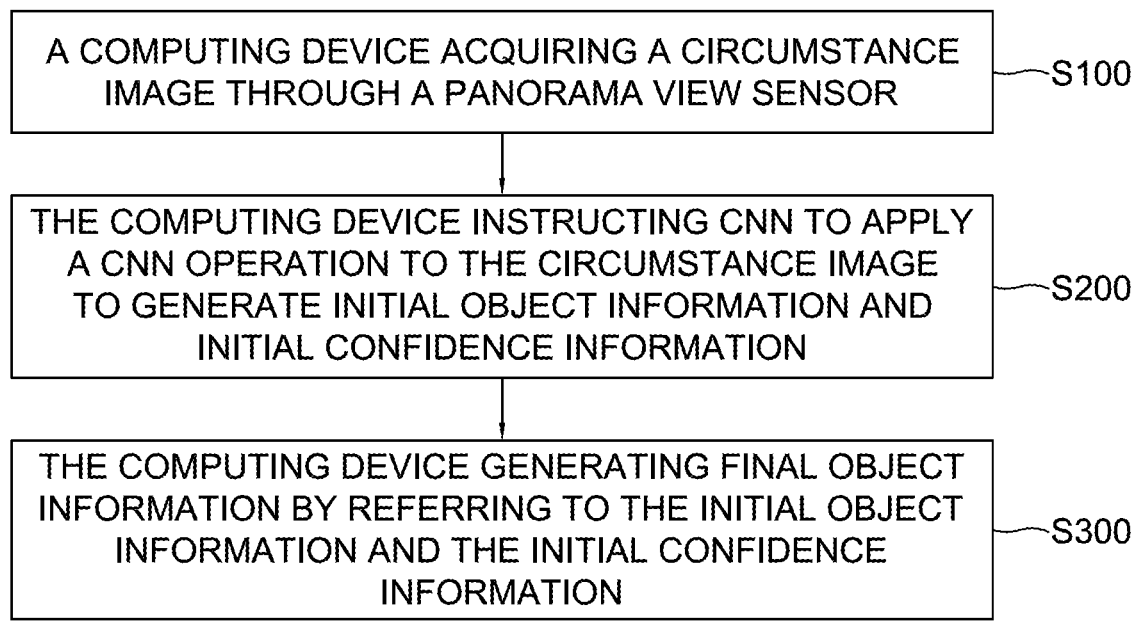
FIG. 2 is a drawing schematically illustrating a flow of the method for achieving the better performance in the autonomous driving while saving the computing powers, by using the confidence scores representing the credibility of the object detection which is generated in parallel with the object detection process in accordance with one example embodiment of the present disclosure.

FIG. 2 is a drawing schematically illustrating a flow of the method for achieving the better performance in the autonomous driving while saving the computing powers, by using the confidence scores representing the credibility of the object detection which is generated in parallel with the object detection process in accordance with one example embodiment of the present disclosure.

By referring to FIG. 2, at a step of S100, the computing device 100 may acquire at least one circumstance image on surroundings of the subject vehicle, through the panorama view sensor installed on the subject vehicle. Thereafter, at a step of S200, the computing device 100 may instruct the CNN 130 to apply at least one CNN operation to the circumstance image, to thereby generate initial object information and initial confidence information on the circumstance image. And, at a step of S300, the computing device may generate final object information on the circumstance image by referring to the initial object information and the initial confidence information.

Brief steps of the method are shown above. Below, it will be explained more specifically. First, an example embodiment corresponding to a singular circumstance image will be explained.

As the circumstance image is acquired through the panorama view sensor, the computing device 100 may instruct the CNN 130 to apply the CNN operation to the circumstance image. Herein, if the circumstance image is acquired through a first panorama view sensor which has been built as the camera, the computing device 100 may instruct a first CNN, which is optimized to a 3-channel image and whose number of input nodes is larger than or same as 3, to apply at least one first CNN operation to the circumstance image, to thereby apply the CNN operation thereto. Otherwise, if the circumstance image is acquired through a second panorama view sensor which has been built as the depth sensor, the computing device 100 may instruct a second CNN, which is optimized to a depth image and whose number of input nodes is larger than or same as 1, to apply at least one second CNN operation to the circumstance image, to thereby apply the CNN operation thereto. Herein, notations of the "first CNN" and the "second CNN" were used for distinguishing CNNs which can function as the CNN 130 in specific cases as shown above. Similarly, notations of the "first panorama view sensor" and the "second panorama view sensor" were used for distinguishing panorama view sensors which can function as the panorama view sensor in the specific cases as shown above.

After the initial object information and the initial confidence information are acquired through the CNN operation, the computing device 100 may perform a re-detection process iteratively to generate the final object information, to be explained below.

That is, as an initial re-detection process, the computing device 100 may first select each of one or more first specific regions, among one or more regions in the circumstance image, whose corresponding confidence score is smaller than a first threshold, by referring to the initial confidence information, and then instruct the CNN 130 to apply the CNN operation to the first specific regions, to thereby generate first adjusted object information and first adjusted confidence information on the circumstance image. To be simple, regions where the CNN 130 is not confident about its result of an object detection, i.e., the first specific regions, are selected, and an object detection is applied again to such regions. The initial confidence information, which supports the computing device 100 to perform such process, is generated by the CNN 130, while it performs the object detection. How the CNN 130 can be trained to perform as shown above will be explained later.

Herein, how the first specific regions can be selected will be explained more specifically. The confidence scores, to be explained later, may have been calculated section by section, in the circumstance image, which is derived by dividing the circumstance image in squares whose number corresponds to a ratio between a size of the circumstance image and a size of a feature map generated for an object detection. For example, if the size of the circumstance image is 48×48 and the size of the feature map is 16×16, each of the confidence scores will be calculated for each of 256 sections whose area is 3×3. As a simple embodiment, the first specific regions may be selected among said sections themselves, however, there can be other example embodiment. That is, one or more extensive regions, including some of the sections whose corresponding confidence scores are smaller than a second threshold, may be found, and one or more bounding boxes which include margins for the extensive regions in a prescribed ratio may be set as the first specific regions. One or more K-th specific regions to be introduced below can be also selected as shown above.

Thereafter, the computing device 100 may perform the re-detection process iteratively. That is, the computing device 100 may select each of the K-th specific regions, among the regions in the circumstance image, whose corresponding confidence score is smaller than the first threshold, by referring to (K−1)-th adjusted confidence information generated beforehand, and then instruct the CNN 130 to apply the CNN operation to the K-th specific regions, to thereby generate K-th adjusted object information and K-th adjusted confidence information on the circumstance image. The K-th adjusted object information may include information on one or more objects in the K-th specific regions, and such information may not have been detected in a (K−P)-th re-detection process performed beforehand but may have been detected this time. Herein, P may be an integer from 1 to K−1. As said before, the re-detection process is applied to the regions where the CNN 130 is not confident, thus such relationship between the pieces of the information may be natural.

In order to perform the re-detection process more efficiently to detect objects in the specific regions whose corresponding confidence scores are small, a selective process, i.e. an upsampling, may be further performed. That is, if one or more L-th specific regions are selected while an L-th re-detection process has been performed, the computing device 100 may generate L-th specific upsampled images by applying at least one upsampling operation to the L-th specific regions by referring to L-th magnification information, and may instruct the CNN 130 to apply the CNN operation to the L-th specific upsampled images, to thereby generate L-th adjusted object information and L-th adjusted confidence information. The L-th magnification information may denote a magnification ratio which has been prescribed for the L-th re-detection process. Herein, each of magnification ratios for each of iterations of the re-detection process may be set as same, or set to be larger for specific iterations to be performed relatively later. Also, any upsampling schematics known before, such as a Nearest Neighbor algorithm, can be used for performing the upsampling operation.

If the re-detection process is performed N times so that N-th adjusted object information and N-th adjusted confidence information are generated, the computing device 100 may generate the final object information by referring to the initial object information and at least part of the first adjusted object information to the N-th adjusted object information.

However, there must be a case when a sufficient result of the object detection is derived even though the re-detection process has not been performed for prescribed times, i.e., N times. For such a case, the iteration may be stopped, and the final object information may be generated by using object information generated until that time. That is, if a sum of one or more areas of one or more M-th specific regions, which have been selected when an M-th re-detection process has been performed, is smaller than the first threshold, the computing device 100 may stop iteratively performing the re-detection process, and may generate the final object information by referring to the initial object information and at least part of the first adjusted object information to (M−1)-th adjusted object information.

In order to generate the final object information, the computing device 100 may perform at least one of a Non-Maximum Suppression algorithm and a Box Voting algorithm by referring to the initial object information and at least part of the first adjusted object information and the N-th adjusted object information. Such algorithms are well-known to a person in the art, thus above explanation will be enough to be understood.

After the final object information is generated as shown above, the computing device 100 may deliver the final object information to an autonomous driving module corresponding to the subject vehicle, to thereby support the autonomous driving module to perform an autonomous driving of the subject vehicle by using the final object information.

So far the example embodiment corresponding to the singular circumstance image has been explained. Below, another example embodiment corresponding to (i) multiple circumstance images to be used for generating an integrated image which is panoramic, and (ii) integrated final object information corresponding thereto will be explained. Said another example embodiment is similar to the example embodiment corresponding to the singular one, thus difference between the two will be explained mainly.

The computing device 100 may generate the integrated final object information on the integrated image by using each of pieces of initial object information and each of pieces of initial confidence information on each of the circumstance images while generating the integrated image including a plurality of the circumstance images as its partial images.

Specifically, (i) on condition that one or more first circumstance images among the circumstance images are acquired through one or more first panorama view sensors, among a plurality of panorama view sensors, corresponding to the camera, the computing device 100 may instruct the first CNN, which is optimized to the 3-channel image and whose number of the input nodes is larger than or same as 3, to apply the first CNN operation to the first circumstance images, and (ii) on condition that one or more second circumstance images among the circumstance images are acquired through one or more second panorama view sensors, among the panorama view sensors, corresponding to the depth sensor, the computing device 100 may instruct the second CNN, which is optimized to the depth image and whose number of the input nodes is larger than or same as 1, to apply the second CNN operation to the second circumstance images. Then, each of pieces of initial confidence information and each of initial object information on each of the circumstance images can be acquired.

Thereafter, as an initial iteration of the re-detection process, the computing device 100 may (i) generate first integrated confidence information on the integrated image by referring to said each of pieces of the initial confidence information, (ii) then may select each of one or more first specific regions, among one or more regions in the integrated image, whose corresponding confidence score is smaller than the first threshold, by referring to the first integrated confidence information, (iii) and may instruct the CNN 130 to apply the CNN operation to the first specific regions, to thereby generate each of pieces of first adjusted object information and each of pieces of first adjusted confidence information on the integrated image.

Then, the computing device 100 may perform the re-detection process iteratively. That is, the computing device 100 (i) may generate K-th adjusted integrated confidence information on the integrated image by referring to each of pieces of (K−1)-th adjusted confidence information, (ii) may then select each of one or more K-th specific regions, among the regions in the integrated image, whose corresponding confidence score is smaller than the first threshold, by referring to the K-th adjusted integrated confidence information, and (iii) may instruct the CNN 130 to apply the CNN operation to the K-th specific regions, to thereby generate each of pieces of K-th adjusted object information and each of pieces of K-th adjusted confidence information on the integrated image.

Finally, if the re-detection process is performed N times so that each of pieces of N-th adjusted object information and each of pieces of N-th adjusted confidence information are generated, the computing device 100 may generate the integrated final object information by referring to the initial object information and at least part of the first adjusted object information to the N-th adjusted object information. As shown above, said another example embodiment is almost same as the original example embodiment except that each of the confidence information and each of the object information are integrated in each of iterations of the re-detection process.

Figure 3:
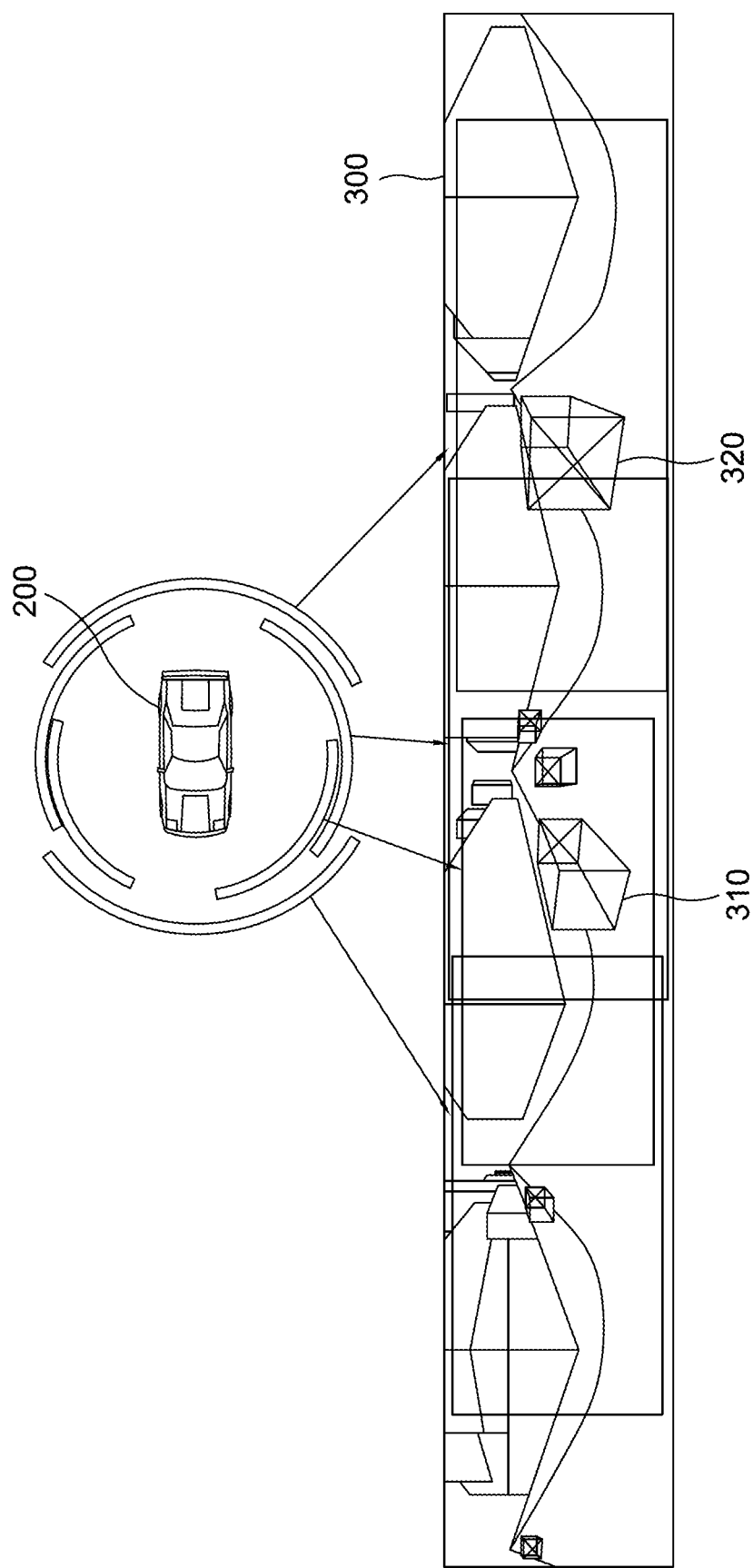
FIG. 3 is a drawing schematically illustrating an example of an integrated image and its corresponding integrated final object information to be used for performing the method for achieving the better performance in the autonomous driving while saving the computing powers, by using the confidence scores representing the credibility of the object detection which is generated in parallel with the object detection process in accordance with one example embodiment of the present disclosure.

In order to take a look at an example of the integrated image and the integrated object information, FIG. 3 will be referred to.

FIG. 3 is a drawing schematically illustrating an example of an integrated image and its corresponding integrated final object information to be used for performing the method for achieving the better performance in the autonomous driving while saving the computing powers, by using the confidence scores representing the credibility of the object detection which is generated in parallel with the object detection process in accordance with one example embodiment of the present disclosure.

By referring to FIG. 3, it can be seen that the integrated image 300 is the panorama image which has been acquired by photographing the surroundings of the subject vehicle 200. Such panorama image is hard to acquire by using only one sensor, thus it is usually acquired by integrating multiple images photographed through multiple sensors. In this case, information on the objects in the integrated image 300, i.e., information on a first vehicle object 310 and information on a second vehicle object 320 can be acquired as the integrated final object information, by using the method of the present disclosure.

So far two example embodiments have been explained. Below, how the CNN 130, to be used for performing the two example embodiments, can be trained will be explained by referring to FIG. 4.

Figure 4:
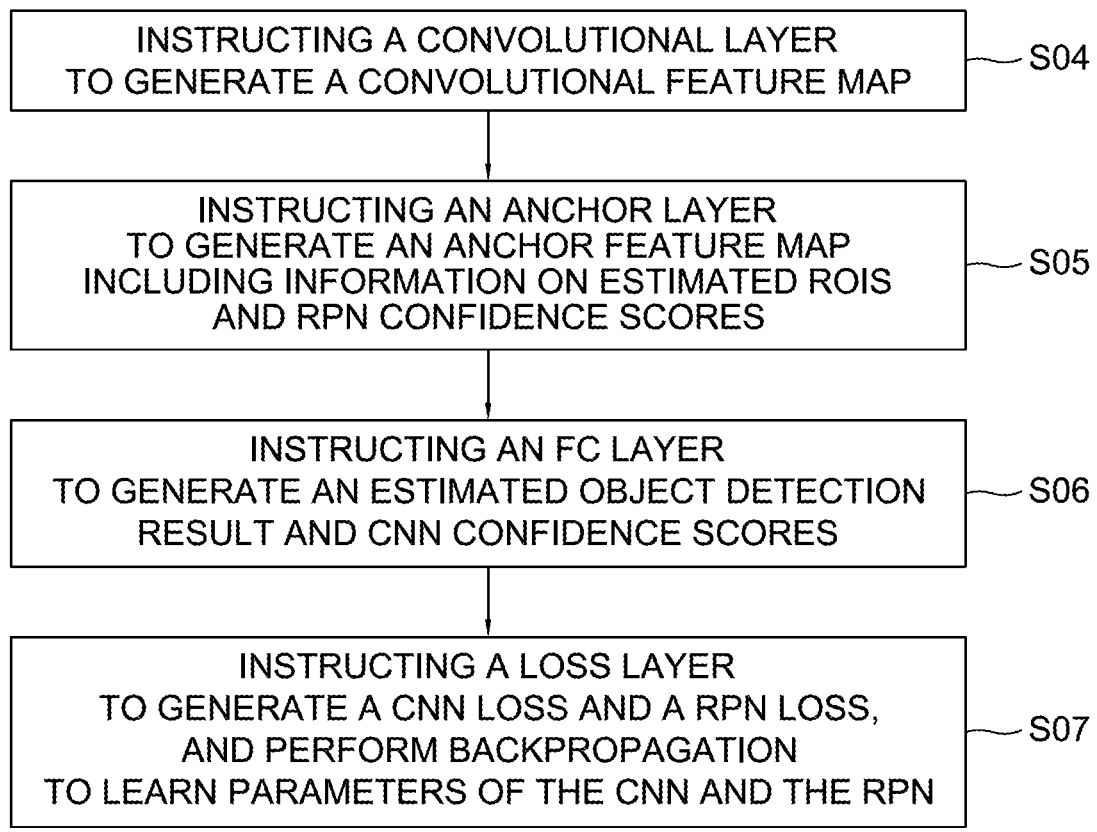
FIG. 4 is a drawing schematically illustrating a flow of a training process of a Convolutional Neural Network (CNN) to be used for performing the method for achieving the better performance in the autonomous driving while saving the computing powers, by using the confidence scores representing the credibility of the object detection which is generated in parallel with the object detection process in accordance with one example embodiment of the present disclosure.

FIG. 4 is a drawing schematically illustrating a flow of a training process of the CNN to be used for performing the method for achieving the better performance in the autonomous driving while saving the computing powers, by using the confidence scores representing the credibility of the object detection which is generated in parallel with the object detection process in accordance with one example embodiment of the present disclosure.

By referring to FIG. 4, a learning method for generating each of confidence scores, which are parameters representing degrees of the credibility of the object detection during a process of the object detection, can be seen briefly.

For reference, in the description below, the phrase "for training" or "training" is added for terms related to the learning process, and the phrase "for testing" or "testing" is added for terms related to the testing process, to avoid possible confusion.

First, at a step of S10, if a training image is acquired, a learning device may instruct a convolutional layer included in the CNN 130 to apply at least one convolutional operation to the training image, to generate at least one convolutional feature map. Herein, in case a geometric size of the training image may be H×W, and a format of the training image is an RGB format so that a channel size of the training image is 3, a data size of the training image may be H×W×3. Since the convolutional operation allows a geometric size of its outputted feature map to be smaller than that of its inputted image, and a channel size of its outputted feature map larger than that of its inputted image, h and w, denoting the geometric size of the convolutional feature map, may be smaller than H and W respectively, and c, denoting the channel size thereof, may be larger than 3, if the size of the convolutional feature map is h×w×c.

Thereafter, at a step of S20, the learning device may instruct an anchor layer in the RPN 140 to output estimated Regions-Of-Interest (ROIs), which are regions expected to include objects in the training image, by applying an anchor operation to values included in the convolutional feature map. Specifically, the RPN 140 may generate an anchor feature map whose data size is h×w×(5A+1), to be used for generating the estimated ROIs on the training image, by applying the anchor operation to the convolutional feature map whose data size is h×w×c. By according to a prior art, the data size of the anchor feature map should have been h×w×5A, but, the anchor feature map in accordance with the present disclosure may include one more channel to include RPN confidence scores to be explained later. A more specific explanation on this will be presented below.

The learning device may instruct the anchor layer of the RPN 140 to generate the anchor feature map whose data size is h×w×5A by applying the anchor operation to the convolutional feature map, where the anchor operation uses sliding-windows each of which corresponds to each set of anchors. Herein, the anchors may be a sort of grids for selecting values of the convolutional feature map corresponding to the objects, and the above-mentioned A, used for representing the data size of the anchor feature map, may denote the number of the anchors used by the RPN 140. By performing this process, whether each of values included in the convolutional feature map corresponds to the objects or not may be determined, and a result of this process, e.g., information on estimated ROIs, may be stored in the anchor feature map. Since the anchor operation is a well-known prior art, more specific explanation will be omitted.

During the process of generating the anchor feature map, the learning device may instruct the RPN 140 to generate each of the RPN confidence scores for each of pixels included in the convolutional feature map, representing each of one or more probabilities of the estimated ROIs being same as Ground-Truth (GT) ROIs. To be simple, the RPN confidence scores are parameters indicating degrees of the credibility of the results, e.g., the estimated ROIs, of the process performed by the RPN 140.

Above, the process of determining the estimated ROIs and the process of generating the RPN confidence scores have been explained separately for convenience, but the two processes may be performed at the same time. That is, as the convolutional feature map is inputted to the RPN 140, each of RPN neurons in the RPN 140 may perform its operations and deliver its operated value to its next RPN neuron, to thereby output the anchor feature map from a final layer of the RPN 140. Thus, the two processes may be performed, dependently affecting each other. However, those two processes may be performed not at the same time. For example, the process of determining the estimated ROIs may be performed first.

After the anchor feature map is generated, the learning device may deliver values of 5A channels therein, including information on the estimated ROIs, to the CNN 130, and deliver values of remaining one channel therein to the confidence layer 150 to be explained later. First, how the values of the 5A channels delivered to the CNN 130 are processed will be explained below.

After said values of the 5A channels are delivered, the learning device may instruct an ROI pooling layer in the CNN 130 to apply at least one ROI pooling operation to the convolutional feature map in order to generate an ROI-pooled feature map by referring to the information on the estimated ROIs, and, at a step of S30, may instruct an FC layer included in the CNN 130 to apply at least one FC operation to the ROI-pooled feature map, to thereby generate an initial object detection result and CNN confidence scores.

Herein, the initial object detection result may include each of initial estimated CNN regression results on each of estimated coordinates of each of bounding boxes including each of the objects, and each of initial estimated CNN classification results on each of class scores of each of the objects, representing each of probabilities of each of the objects being included in each of classes. Such process of generating the initial object detection result is a well-known prior art.

And, the CNN confidence scores may include information on degrees of an estimated object detection result being same as a GT object detection result, to be explained later. Herein, the estimated object detection result may have been generated by applying Non-Maximum Suppression (NMS) operation to the initial object detection result. Specifically, each of the CNN confidence scores may represent each of one or more probabilities of each of the one or more estimated CNN classification results and each of the one or more estimated CNN regression results included in the estimated object detection result being same as each of one or more GT CNN classification results and each of one or more GT CNN regression results included in the GT object detection result. To be simple, the CNN confidence scores may represent degrees of credibility on results generated by the FC layer of the CNN 130.

The reason why the CNN confidence scores and the RPN confidence scores are both used is that estimated ROIs initially determined by the RPN 140 are processed by the CNN 130 later, in order to generate the estimated object detection result. Since the two networks both involve in the processes of generating the estimated object detection result, thus the two networks should be evaluated differently.

For example, even in case a specific estimated ROI is wrongly determined by the RPN 140, the FC layer of the CNN 130 may be able to filter the specific estimated ROI which has been wrongly determined. Or, even in case the specific estimated ROI is determined properly by the RPN 140, the FC layer of the CNN 130 may wrongly determine that the specific estimated ROI does not include any objects. As can be seen in such cases, the RPN 140 and the CNN 130 may perform wrongly or properly, thus such cases should be considered during evaluating the object detection process.

Similar to RPN 140, (i) the process of generating the initial object detection result and its corresponding estimated object detection result and (ii) the process of generating the CNN confidence map have been explained separately for convenience, but those two processes may be performed by the FC layer at the same time, dependently to each other. However, those two processes may be performed independently.

After such CNN confidence scores are generated for the estimated ROIs, a CNN confidence map including the CNN confidence scores may be generated.

Thereafter, the learning device may instruct the CNN 130 to integrate bounding boxes corresponding to overlapped estimated ROIs by applying the NMS to the initial object detection result, to thereby generate the estimated object detection result. As the overlapped ones are integrated, specific CNN confidence scores corresponding to specific estimated ROIs, which have not been overlapped to other estimated ROIs, may be selected. Herein, such usage of the NMS is a well-known prior art, thus more specific explanation is omitted.

Meanwhile, the learning device may instruct the confidence layer 150 to acquire values of the one channel in the anchor feature map, which correspond to the RPN confidence map, and generate a resized RPN confidence map whose geometric size is H×W, same as the training image, by using the RPN confidence map. In order to generate the resized RPN confidence map, any of resizing operations, e.g., Nearest Neighbor Size, Bilinear Resize, Bicubic Resize or Lanczos Resize, may be applied to the RPN confidence map, to pair each of RPN confidence scores with each of pixels in the training image.

After the estimated object detection result and the resized RPN confidence map are acquired, the learning device may instruct the confidence layer 150 to generate an integrated confidence map by referring thereto. Herein, integrated confidence scores included in the integrated confidence map may be calculated by using a following formula:

$$c'_{xy} = \max\left(c_{xy}, \max_{r_i:(x,y) \in r_i} c_{r_i}\right)$$

Herein, $c'_{xy}$ may denote an (X_Y)-th integrated confidence score and $c_{xy}$ may denote an (X_Y)-th resized RPN confidence score corresponding to a coordinate (x,y) on the resized RPN confidence map. Also, $c_{r_i}$ may denote an i-th CNN confidence score for an i-th estimated ROI, denoted as $r_i$, including the coordinate (x,y), which has been determined in the NMS result. The learning device may instruct the confidence layer 150 to generate the integrated confidence map by using the integrated confidence scores generated as shown above.

In order to generate the integrated confidence map properly, the CNN 130 and the RPN 140 should be trained. Below how the two networks can be trained will be presented.

That is, at a step of S40, the learning device may instruct the loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN 130 and the RPN 140. Below, how to generate the RPN loss and the CNN loss will be explained.

First, the RPN loss can be generated by using a following formula:

$$L_{RPN}(\{p_i\},\{t_i\}) = \frac{1}{N_{cls}}$$

$$\left( \sum_{i:p_i^* = I(p_i > 0.5)} (1.1 - c_i) L_{cls}(p_i, p_i^*) + \sum_{i:p_i^* \neq I(p_i > 0.5)} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

Herein, N, may denote a constant corresponding to a size of the convolutional feature map generated by performing the anchor operation, and $N_{cls}$ may denote a constant corresponding to the training image. Also, $c_i$ may denote an i-th RPN confidence score corresponding to an i-th pixel of the convolutional feature map, among the RPN confidence scores, $p_i$ may denote an i-th estimated RPN classification result corresponding to the i-th pixel, and $p_i^*$ may denote an i-th GT RPN classification result corresponding to the i-th pixel, And, $t_i$ may denote an i-th estimated RPN regression result corresponding to the i-th pixel, and $t_i^*$ may denote an i-th GT RPN regression result corresponding to the i-th pixel. The i-th GT RPN classification result and the i-th GT RPN regression result may correspond to the GT object detection result. Also, $L_{cls}$ and $L_{reg}$ may be implemented by using any of prior arts for generating losses, e.g., smooth-L1 loss.

In the formula, a first term of the formula may denote a classification loss, and a second one may denote a regression loss. The regression loss term, i.e., the second term, is a well-known prior art, thus further explanation is omitted. Below, the classification loss term, i.e., the first term will be explained.

The classification loss term may include three sub-terms in a parenthesis as shown above. In the first sub-term thereof, a condition i: $p_i^*=I(p_i>0.5)$ represents a case that the i-th estimated RPN classification result, determined by the RPN 140, corresponding to the i-th pixel of the anchor feature map, is same as the i-th GT RPN classification result. To be simple, it represents a case that the RPN 140 has analyzed the i-th pixel of the convolutional feature map correctly. Herein, it is assumed that the RPN 140 has analyzed the i-th pixel "correctly", if the RPN 140 has determined the i-th estimated RPN classification result to be same as the i-th GT RPN classification result with a probability larger than a threshold probability, herein 0.5 for convenience. In the first sub-term, (1.1−$c_i$) allows the i-th RPN confidence score to be larger when the RPN 140 has analyzed the i-th pixel correctly, since parameters of the RPN 140 are adjusted to make the RPN loss smaller. Specifically, the classification loss term including the first sub-term generated as shown above is referred to, in order to generate gradients for allowing the parameters of the RPN 140 to be adjusted, to thereby allow a future RPN loss to be smaller. Thus, by using the classification loss term including the first sub-term, the RPN 140 may generate larger RPN confidence scores in case the RPN 140 analyzes the values of the convolutional feature map correctly.

In the second sub-term of the classification loss term, a condition i:$p_i^* \neq I(p_i > 0.5)$ represents a case that the RPN 140 has analyzed the i-th pixel incorrectly. In the second sub-term, $(0.1 + c_i)$ allows the i-th RPN confidence score to be smaller when the RPN 140 has analyzed the i-th pixel incorrectly. A mechanism of such training processes may be same as that of the first sub-term.

In the third sub-term, $c_i \log c_i$ allows a distribution of the RPN confidence scores not to be similar to that of a step function. If the classification loss term only includes the first sub-term and the second sub-term, the RPN confidence scores may be overfitted so that those may include only extreme values close to 0 or 1. Herein, $c_i \log c_i$ is the smallest when $c_i$ is 0.5. Thus, the distribution of the RPN confidence scores in accordance with the present disclosure may be more diverse, including various values between 0 and 1. Since various situations can be dealt with by using the RPN confidence scores including the various values as shown above, this term is necessary.

Since the RPN 140 loss in accordance with the present disclosure have been explained above, the CNN 130 loss will be presented below.

$$L_{CNN}(\{p_i\}, \{t_i\}) = \frac{1}{N_{cls}} \left( \sum_{i: p_i^* = I(p_i = \text{largest score among class scores})} (1.1 - c_i) L_{cls}(p_i, p_i^*) + \sum_{i: p_i^* \neq I(p_i = \text{largest score among class scores})} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

Herein $N_{reg}$ and $N_{cls}$ may denote the number of the estimated ROIs, and $c_i$ may denote an i-th CNN confidence score, corresponding to an i-th estimated ROI among the estimated ROIs, among the CNN confidence scores. Also, $p_i$ may denote an i-th estimated CNN classification result corresponding to the i-th estimated ROI, $p_i^*$ may denote an i-th GT CNN classification result corresponding to the i-th pixel. And, $t_i$ may denote an i-th estimated CNN regression result corresponding to the i-th estimated ROI, and $t_i^*$ may denote an i-th GT CNN regression result corresponding to the i-th pixel. The i-th estimated CNN classification result and the i-th estimated CNN regression result may correspond to the estimated object detection result. In this formula, notations may be same as that of the RPN loss, but it may be different as shown above.

As can be seen in the formula above, the CNN loss may be similar to the RPN loss, except their conditions of sigma functions. Herein, the conditions on $p_i$ include $p_i$=largest score among class scores, not $p_i > 0.5$ as the RPN 140 loss. Such conditions may represent that $p_i$ is related to the i-th estimated CNN classification result on a specific class whose probability of including a specific object in the i-th estimated ROI is the largest. Similar to the RPN loss, a first sub-term of a classification loss term in the CNN loss may represent a case that the CNN 130 has analyzed the i-th estimated ROI correctly, and the second sub-term may represent another case that the CNN 130 has analyzed the i-th estimated ROI incorrectly. The CNN loss and the RPN loss are similar to each other, thus further explanation is omitted.

After the CNN loss and the RPN loss are generated as shown above, the learning device may instruct the loss layer to learn at least part of parameters included in the CNN 130 and the RPN 140 by performing backpropagation using the CNN loss and the RPN loss respectively. Thereafter, while the CNN 130 and the RPN 140 perform processes of detecting objects included in an image to be inputted, the CNN 130 and the RPN 140 may more accurately generate CNN confidence scores and RPN confidence scores corresponding to said image to be inputted.

After the training process is done, the learning device may deliver the CNN 130 to the computing device 100. The RPN 140 and the confidence layer 150 are subordinate to the CNN 130, thus those will also be delivered to the computing device 100. The CNN 130, the RPN 140 and the confidence layer 150 may perform operations similar to those performed during the training process by using fully trained parameters. That is, as the CNN 130 acquires the circumstance image, the CNN 130, the RPN 140 and the confidence layer 150 may generate the initial confidence information in a way same as the way of generating the integrated confidence map during the training process, along with the initial object information.

Herein, for reference, an additional explanation on how the CNN 130, the RPN 140, the loss layer 150 and the confidence layer 160 interwork to generate the confidence scores while performing the object detection, will be given by referring to FIG. 5.

Figure 5:
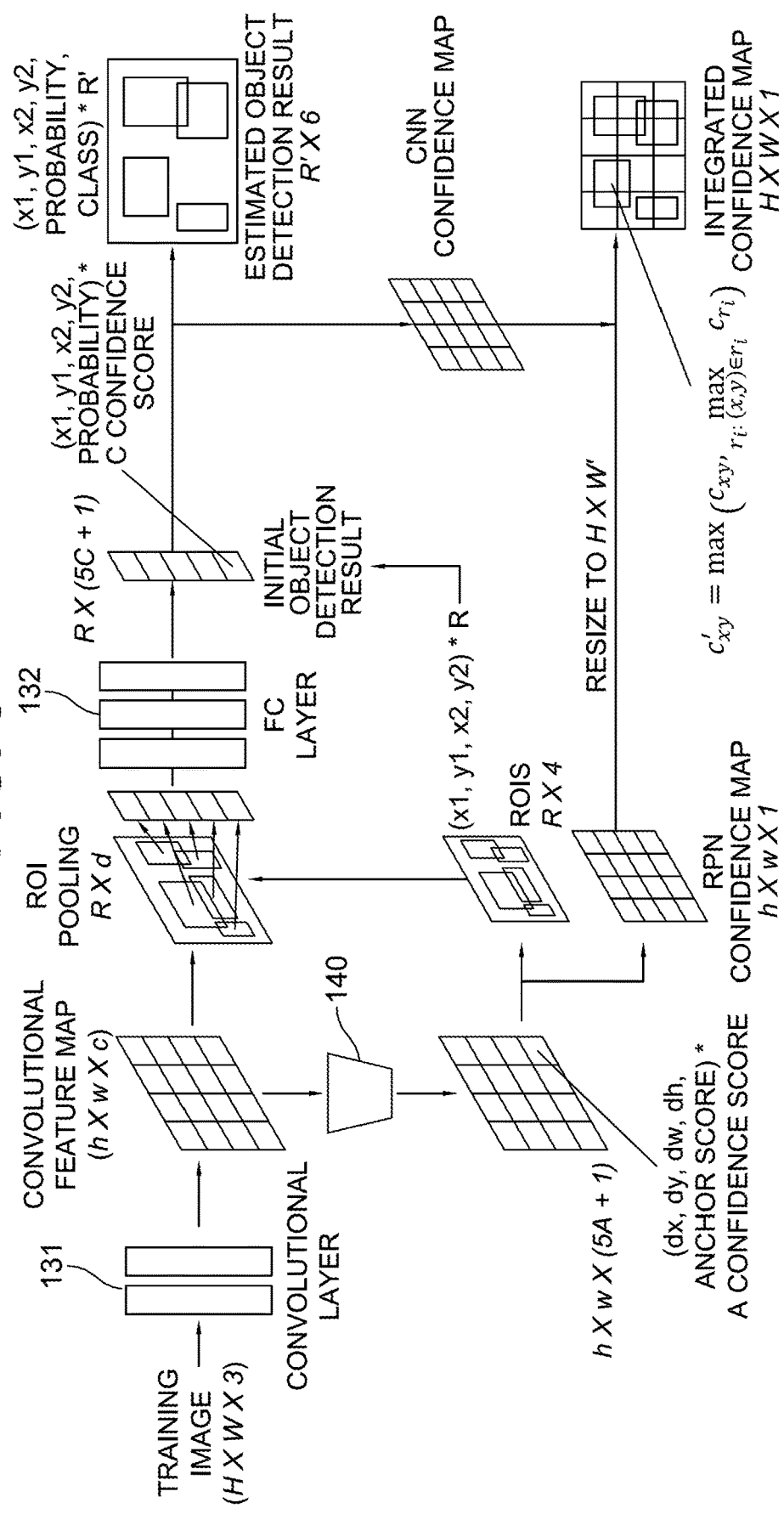
FIG. 5 is a drawing schematically illustrating a learning device including a Convolutional Neural Network (CNN), a Region Proposal Network (RPN), a loss layer and a confidence layer to be used for performing the learning method for switching the modes of the autonomous vehicle based on the on-device standalone prediction to thereby achieve the safety of the autonomous driving in accordance with one example embodiment of the present disclosure.

FIG. 5 is a drawing schematically illustrating the learning device including the CNN, the RPN, the loss layer and the confidence layer to be used for performing the learning method for switching the modes of the autonomous vehicle based on the on-device standalone prediction to thereby achieve the safety of the autonomous driving in accordance with one example embodiment of the present disclosure.

By referring to FIG. 5, it can be seen that the training image is inputted to the convolutional layer 131 in the CNN 130, and the convolutional feature map with a size of h×w×c is outputted therefrom. Then, the convolutional feature map may be processed by the RPN 140, and the RPN 140 may output a feature map with a size of h×w×(5A+1), in which locations of the ROIs shown as (dx,dy,dw,dh) and their RPN confidence scores are included. The ROIs may be delivered to the ROI pooling layer (not illustrated) in the CNN 130, thus the convolutional feature map may be pooled by referring to the ROIs accordingly. Thereafter, the FC layer 132 in the CNN 130 may process the ROI-pooled feature map with a size of R×d to generate the initial object detection result with a size of R×(5C+1), in which estimated locations of objects shown as (x1,y1,x2,y2), their probabilities of being included in each of classes, and CNN confidence scores for each of pixels corresponding to the objects are included. Finally, the CNN may apply the NMS to the initial object detection result to generate the estimated object detection result with a size of R'×6, in which the estimated locations of objects shown as (x1,y1,x2,y2), their estimated classes, and their probabilities of being included in said estimated classes are included. Herein R' may denote integrated ROIs generated by the NMS. The CNN confidence map may be outputted along with the estimated object detection result, and integrated with the resized RPN confidence map generated from the RPN confidence map with a size of hxwx1 to generate the integrated confidence map with a size of H×W×1. Such process is in accord with the above-explained learning method.

By supporting the autonomous driving module to use additional information acquired by applying object detection again to parts where degrees of the credibility are low, a safer autonomous driving may be achieved.

The present disclosure has an effect of providing a method for an attention-driven resource allocation by using an AVM to thereby achieve a safety of an autonomous driving.

The present disclosure has another effect of providing a method for generating confidence scores, which are parameters representing a credibility of an object detection, in parallel with a process of the object detection.

The present disclosure has still another effect of providing a method for performing more accurate object detection by repeating the object detection on regions whose confidence scores are smaller than a threshold.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for achieving better performance in an autonomous driving while saving computing powers, by using confidence scores representing a credibility of an object detection which is generated in parallel with an object detection process, comprising steps of:
   (a) a computing device acquiring at least one circumstance image on surroundings of a subject vehicle, through at least one panorama view sensor installed on the subject vehicle;
   (b) the computing device instructing a Convolutional Neural Network (CNN) to apply at least one CNN operation to the circumstance image, to thereby generate initial object information and initial confidence information on the circumstance image; and
   (c) the computing device generating final object information on the circumstance image by referring to the initial object information and the initial confidence information;
   wherein the step of (c) includes steps of:
   (c1) the computing device performing a re-detection process of (i) first selecting each of one or more first specific regions, among one or more regions in the circumstance image, whose corresponding confidence score is smaller than a threshold, by referring to the initial confidence information and (ii) then instructing the CNN to apply the CNN operation to the first specific regions, to thereby generate first adjusted object information and first adjusted confidence information on the circumstance image;
   (c2) the computing device iteratively performing the re-detection process, by (i) selecting each of one or more K-th specific regions, among the regions in the circumstance image, whose corresponding confidence score is smaller than the threshold, by referring to (K−1)-th adjusted confidence information generated beforehand and (ii) then instructing the CNN to apply the CNN operation to the K-th specific regions, to thereby generate K-th adjusted object information and K-th adjusted confidence information on the circumstance image; and
   (c3) the computing device, if the re-detection process is performed N times so that N-th adjusted object information and N-th adjusted confidence information are generated, generating the final object information by referring to the initial object information and at least part of the first adjusted object information to the N-th adjusted object information; and
   wherein K is an integer from 2 to N, and N is a prescribed integer.

2. The method of claim 1, wherein the computing device, if a sum of one or more areas of one or more M-th specific regions, which have been selected when an M-th re-detection process has been performed, is smaller than a threshold, stops iteratively performing the re-detection process, and generates the final object information by referring to the initial object information and at least part of the first adjusted object information to (M−1)-th adjusted object information, wherein M is an integer from 1 to N−1.

3. The method of claim 1, wherein the computing device, if one or more L-th specific regions are selected while an L-th re-detection process has been performed, generates L-th specific upsampled images by applying at least one upsampling operation to the L-th specific regions by referring to L-th magnification information, and instructs the CNN to apply the CNN operation to the L-th specific upsampled images, to thereby generate L-th adjusted object information and L-th adjusted confidence information, wherein L is an integer from 1 to N.

4. The method of claim 1, wherein, the computing device performs at least one of an Non-Maximum Suppression algorithm and a Box Voting algorithm by referring to the initial object information and at least part of the first adjusted object information and the N-th adjusted object information, to thereby generate the final object information.

5. A method for achieving better performance in an autonomous driving while saving computing powers, by using confidence scores representing a credibility of an object detection which is generated in parallel with an object detection process, comprising steps of:

(a) a computing device acquiring at least one circumstance image on surroundings of a subject vehicle, through at least one panorama view sensor installed on the subject vehicle;
(b) the computing device instructing a Convolutional Neural Network (CNN) to apply at least one CNN operation to the circumstance image, to thereby generate initial object information and initial confidence information on the circumstance image; and
(c) the computing device generating final object information on the circumstance image by referring to the initial object information and the initial confidence information;
wherein, at the step of (c), the computing device, while generating an integrated image including a plurality of circumstance images as its partial images, generates integrated final object information on the integrated image by using each of pieces of initial object information and each of pieces of initial confidence information on each of the circumstance images, wherein the integrated final object information is generated by performing following steps of:
(c4) the computing device performing a re-detection process of (i) generating first integrated confidence information on the integrated image by referring to said each of pieces of the initial confidence information, (ii) then selecting each of one or more first specific regions, among one or more regions in the integrated image, whose corresponding confidence score is smaller than a threshold, by referring to the first integrated confidence information, (iii) and finally instructing the CNN to apply the CNN operation to the first specific regions, to thereby generate each of pieces of first adjusted object information and each of pieces of first adjusted confidence information on the integrated image;
(c5) the computing device iteratively performing the re-detection process, by (i) generating K-th adjusted integrated confidence information on the integrated image by referring to each of pieces of (K−1)-th adjusted confidence information, (ii) then selecting each of one or more K-th specific regions, among the regions in the integrated image, whose corresponding confidence score is smaller than the threshold, by referring to the K-th adjusted integrated confidence information, (iii) and finally instructing the CNN to apply the CNN operation to the K-th specific regions, to thereby generate each of pieces of K-th adjusted object information and each of pieces of K-th adjusted confidence information on the integrated image; and
(c6) the computing device, if the re-detection process is performed N times so that each of pieces of N-th adjusted object information and each of pieces of N-th adjusted confidence information are generated, generating the integrated final object information by referring to the initial object information and at least part of the first adjusted object information to the N-th adjusted object information; and
wherein K is an integer from 2 to N, and N is a prescribed integer.

6. The method of claim 5, wherein (i) on condition that one or more first circumstance images are acquired through one or more first panorama view sensors, among a plurality of panorama view sensors, corresponding to a camera, the computing device instructs a first CNN, which is optimized to a 3-channel image and whose number of input nodes is larger than or same as 3, to apply at least one first CNN operation to the first circumstance images, and (ii) on condition that one or more second circumstance images are acquired through one or more second panorama view sensors corresponding to a depth sensor, the computing device instructs a second CNN, which is optimized to a depth image and whose number of input nodes is larger than or same as 1, to apply at least one second CNN operation to the second circumstance images.

7. The method of claim 1, further comprising a step of:
(d) the computing device delivering the final object information to an autonomous driving module, to thereby support the autonomous driving module to perform an autonomous driving of the subject vehicle by using the final object information.

8. A method for achieving better performance in an autonomous driving while saving computing powers, by using confidence scores representing a credibility of an object detection which is generated in parallel with an object detection process, comprising steps of:
(a) a learning device, if a training image is acquired, instructing at least one convolutional layer included in a Convolutional Neural Network (CNN) to generate at least one convolutional feature map by applying at least one convolutional operation to the training image;
(b) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores;
(c) the learning device, if at least one ROI-Pooled feature map is acquired, which has been generated by using the convolutional feature map and the estimated ROIs through an ROT pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores;
(d) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN;
(e) a computing device acquiring at least one circumstance image on surroundings of a subject vehicle, through at least one panorama view sensor installed on the subject vehicle;
(f) the computing device instructing the CNN to apply at least one CNN operation to the circumstance image, to thereby generate initial object information and initial confidence information on the circumstance image; and (g) the computing device generating final object information on the circumstance image by referring to the initial object information and the initial confidence information.

9. The method of claim 8, wherein, at the step of (d), the learning device instructs the loss layer to generate the RPN loss by using a following formula:

$$L_{RPN}(\{p_i\}, \{t_i\}) = \frac{1}{N_{cls}}$$

$$\left( \sum_{i:p_i^*=I(p_i>0.5)} (1.1-c_i)L_{cls}(p_i, p_i^*) + \sum_{i:p_i^* \neq I(p_i>0.5)} (0.1+c_i)L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding to the i-th pixel, $t_i$ denotes an i-th estimated RPN regression result corresponding to the i-th pixel, and $t_i^*$ denotes an i-th GT RPN regression result corresponding to the i-th pixel, and wherein, the i-th GT RPN classification result and the i-th GT RPN regression result correspond to the GT object detection result.

10. The method of claim 8, wherein, at the step of (d), the learning device instructs the loss layer to generate the CNN loss by using a following formula:

$$L_{CNN}(\{p_i\}, \{t_i\}) =$$

$$\frac{1}{N_{cls}} \left( \sum_{i:p_i^*=I(p_i=largest\ score\ among\ class\ scores)} (1.1-c_i)L_{cls}(p_i, p_i^*) + \sum_{i:p_i^* \neq I(p_i=largest\ score\ among\ class\ scores)} (0.1+c_i)L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROI, $p_i^*$ denotes an i-th GT CNN classification result corresponding to the i-th pixel, $t_i$ denotes an i-th estimated CNN regression result corresponding to the i-th estimated ROI, and $t_i^*$ denotes an i-th GT CNN regression result corresponding to the i-th pixel, and wherein the i-th estimated CNN classification result and the i-th estimated CNN regression result correspond to the estimated object detection result.

11. The method of claim 8, wherein, after the step of (c), the learning device instructs a confidence layer to generate an integrated confidence map including information on each of integrated confidence scores for each of pixels in the training image by referring to the RPN confidence map and the CNN confidence map.

12. The method of claim 11, wherein the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

13. The method of claim 12, wherein the learning device instructs the confidence layer to generate an (X_Y)-th integrated confidence score, corresponding to a coordinate (x,y) on the training image, among the integrated confidence scores, by using a following formula:

$$c'_{xy} = \max\left(c_{xy}, \max_{r_i:(x,y) \in r_i} c_{r_i}\right)$$

wherein $c_{xy}'$ denotes the (X_Y)-th integrated confidence score, $c_{xy}$ denotes an (X_Y)-th resized RPN confidence score corresponding to a coordinate (x,y) on the resized RPN confidence map, and $c_{r_i}$ denotes an i-th CNN confidence score for an i-th estimated ROI, denoted as $r_i$, including the coordinate (x,y), which has been determined in the NMS result.

14. A method for achieving better performance in an autonomous driving while saving computing powers, by using confidence scores representing a credibility of an object detection which is generated in parallel with an object detection process, comprising steps of:
(a) a computing device acquiring at least one circumstance image on surroundings of a subject vehicle, through at least one panorama view sensor installed on the subject vehicle;
(b) the computing device instructing a Convolutional Neural Network (CNN) to apply at least one CNN operation to the circumstance image, to thereby generate initial object information and initial confidence information on the circumstance image; and
(c) the computing device generating final object information on the circumstance image by referring to the initial object information and the initial confidence information;
wherein the step of (b) includes steps of:
(b1) the computing device, if the circumstance image is acquired, instructing at least one convolutional layer included in the CNN to generate at least one convolutional feature map by applying at least one convolutional operation to the circumstance image;
(b2) the computing device, during a process of generating estimated Regions-Of-Interest (ROIs) on the circumstance image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores;

(b3) the computing device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and (b4) the computing device instructing a confidence layer interworking with the CNN to generate an integrated confidence map by referring to the RPN confidence map and the CNN confidence map, wherein the computing device instructs the CNN to output the initial object information including the estimated object detection result and the initial confidence information including the integrated confidence map.

15. A computing device for achieving better performance in an autonomous driving while saving computing powers, by using confidence scores representing a credibility of an object detection which is generated in parallel with an object detection process, comprising:

at least one memory that stores instructions; and at least one processor configured to execute the instructions to perform processes of:

(I) acquiring at least one circumstance image on surroundings of a subject vehicle, through at least one panorama view sensor installed on the subject vehicle;

(II) instructing a Convolutional Neural Network (CNN) to apply at least one CNN operation to the circumstance image, to thereby generate initial object information and initial confidence information on the circumstance image; and (III) generating final object information on the circumstance image by referring to the initial object information and the initial confidence information;

wherein the process of (III) further includes processes of:

(III1) performing a re-detection process of (i) first selecting each of one or more first specific regions, among one or more regions in the circumstance image, whose corresponding confidence score is smaller than a threshold, by referring to the initial confidence information and (ii) then instructing the CNN to apply the CNN operation to the first specific regions, to thereby generate first adjusted object information and first adjusted confidence information on the circumstance image;

(III2) iteratively performing the re-detection process, by (i) selecting each of one or more K-th specific regions, among the regions in the circumstance image, whose corresponding confidence score is smaller than the threshold, by referring to (K−1)-th adjusted confidence information generated beforehand and (ii) then instructing the CNN to apply the CNN operation to the K-th specific regions, to thereby generate K-th adjusted object information and K-th adjusted confidence information on the circumstance image; and (III3) if the re-detection process is performed N times so that N-th adjusted object information and N-th adjusted confidence information are generated, generating the final object information by referring to the initial object information and at least part of the first adjusted object information to the N-th adjusted object information, and wherein K is an integer from 2 to N, and N is a prescribed integer.

16. The device of claim 15, wherein the processor, if a sum of one or more areas of one or more M-th specific regions, which have been selected when an M-th re-detection process has been performed, is smaller than a threshold, stops iteratively performing the re-detection process, and generates the final object information by referring to the initial object information and at least part of the first adjusted object information to (M−1)-th adjusted object information, wherein M is an integer from 1 to N−1.

17. The device of claim 15, wherein the processor, if one or more L-th specific regions are selected while an L-th re-detection process has been performed, generates L-th specific upsampled images by applying at least one upsampling operation to the L-th specific regions by referring to L-th magnification information, and instructs the CNN to apply the CNN operation to the L-th specific upsampled images, to thereby generate L-th adjusted object information and L-th adjusted confidence information, wherein L is an integer from 1 to N.

18. The device of claim 15, wherein, the processor performs at least one of an Non-Maximum Suppression algorithm and a Box Voting algorithm by referring to the initial object information and at least part of the first adjusted object information and the N-th adjusted object information, to thereby generate the final object information.

19. A computing device for achieving better performance in an autonomous driving while saving computing powers, by using confidence scores representing a credibility of an object detection which is generated in parallel with an object detection process, comprising:

at least one memory that stores instructions; and at least one processor configured to execute the instructions to perform processes of:

(I) acquiring at least one circumstance image on surroundings of a subject vehicle, through at least one panorama view sensor installed on the subject vehicle;

(II) instructing a Convolutional Neural Network (CNN) to apply at least one CNN operation to the circumstance image, to thereby generate initial object information and initial confidence information on the circumstance image; and (III) generating final object information on the circumstance image by referring to the initial object information and the initial confidence information;

wherein, at the process of (III), the processor, while generating an integrated image including a plurality of circumstance images as its partial images, generates integrated final object information on the integrated image by using each of pieces of initial object information and each of pieces of initial confidence information on each of the circumstance images; and wherein the integrated final object information is generated by performing following processes of:

(III4) performing a re-detection process of (i) generating first integrated confidence information on the integrated image by referring to said each of pieces of the initial confidence information, (ii) then selecting each of one or more first specific regions, among one or more regions in the integrated image, whose corresponding confidence score is smaller than a threshold, by referring to the first integrated confidence information, (iii) and finally instructing the CNN to apply the CNN operation to the first specific regions, to thereby generate each of pieces of first adjusted object information and each of pieces of first adjusted confidence information on the integrated image;

(III5) iteratively performing the re-detection process, by (i) generating K-th adjusted integrated confidence information on the integrated image by referring to each of pieces of (K−1)-th adjusted confidence information, (ii) then selecting each of one or more K-th specific regions, among the regions in the integrated image, whose corresponding confidence score is smaller than the threshold, by referring to the K-th adjusted integrated confidence information, (iii) and finally instructing the CNN to apply the CNN operation to the K-th specific regions, to thereby generate each of pieces of K-th adjusted object information and each of pieces of K-th adjusted confidence information on the integrated image; and (III6) if the re-detection process is performed N times so that each of pieces of N-th adjusted object information and each of pieces of N-th adjusted confidence information are generated, generating the integrated final object information by referring to the initial object information and at least part of the first adjusted object information to the N-th adjusted object information, and wherein K is an integer from 2 to N, and N is a prescribed integer.

20. The device of claim 19, wherein (i) on condition that one or more first circumstance images are acquired through one or more first panorama view sensors, among a plurality of panorama view sensors, corresponding to a camera, the processor instructs a first CNN, which is optimized to a 3-channel image and whose number of input nodes is larger than or same as 3, to apply at least one first CNN operation to the first circumstance images, and (ii) on condition that one or more second circumstance images are acquired through one or more second panorama view sensors corresponding to a depth sensor, the processor instructs a second CNN, which is optimized to a depth image and whose number of input nodes is larger than or same as 1, to apply at least one second CNN operation to the second circumstance images.

21. The device of claim 15, wherein the processor further performs a process of:
(IV) delivering the final object information to an autonomous driving module, to thereby support the autonomous driving module to perform an autonomous driving of the subject vehicle by using the final object information.

22. A computing device for achieving better performance in an autonomous driving while saving computing powers, by using confidence scores representing a credibility of an object detection which is generated in parallel with an object detection process, comprising:
at least one memory that stores instructions; and
at least one processor configured to execute the instructions to perform processes of:
(I) acquiring at least one circumstance image on surroundings of a subject vehicle, through at least one panorama view sensor installed on the subject vehicle;
(II) instructing a Convolutional Neural Network (CNN) to apply at least one CNN operation to the circumstance image, to thereby generate initial object information and initial confidence information on the circumstance image; and
(III) generating final object information on the circumstance image by referring to the initial object information and the initial confidence information;
wherein before the process of (I), the CNN is trained by performing processes of:
(I1) a learning device, if a training image is acquired, instructing at least one convolutional layer included in the CNN to generate at least one convolutional feature map by applying at least one convolutional operation to the training image;
(I2) the learning device, during a process of generating estimated Regions-Of-Interest (ROIs) on the training image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores;
(I3) the learning device, if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and
(I4) the learning device instructing a loss layer to generate at least one RPN loss and at least one CNN loss by referring to the RPN confidence map, the CNN confidence map, the estimated object detection result and the GT object detection result, and perform backpropagation by using the RPN loss and the CNN loss to learn at least part of parameters in the CNN and the RPN.

23. The device of claim 22, wherein, at the process of (I4), the learning device instructs the loss layer to generate the RPN loss by using a following formula:

$$L_{RPN}(\{p_i\}, \{t_i\}) = \frac{1}{N_{cls}} \left( \sum_{i: p_i^* = I(p_i > 0.5)} (1.1 - c_i) L_{cls}(p_i, p_i^*) + \sum_{i: p_i^* \neq I(p_i > 0.5)} (0.1 + c_i) L_{cls}(p_i, p_i^*) + \sum_i c_i \log c_i \right) + \lambda \frac{1}{N_{reg}} \sum_i p_i^* L_{reg}(t_i, t_i^*)$$

wherein $N_{reg}$ denotes a constant corresponding to a size of the convolutional feature map generated by performing the anchor operation, $N_{cls}$ denotes a constant corresponding to the training image, $c_i$ denotes an i-th RPN confidence score corresponding to an i-th pixel of the convolutional feature map, among the RPN confidence scores, $p_i$ denotes an i-th estimated RPN classification result corresponding to the i-th pixel, $p_i^*$ denotes an i-th GT RPN classification result corresponding to the i-th pixel, $t_i$ denotes an i-th estimated RPN regression result corresponding to the i-th pixel, and $t_i^*$ denotes an i-th GT RPN regression result corresponding to the i-th pixel, and wherein, the i-th GT RPN classification result and the i-th GT RPN regression result correspond to the GT object detection result.

24. The device of claim 22, wherein, at the process of (I4), the learning device instructs the loss layer to generate the CNN loss by using a following formula:

$$L_{CNN}(\{p_i\},\{t_i\}) = \frac{1}{N_{cls}}\left(\sum_{i:p_i^*=I(p_i=\text{largest score among class scores})}(1.1-c_i)L_{cls}(p_i,p_i^*) + \sum_{i:p_i^*\neq I(p_i=\text{largest score among class scores})}(0.1+c_i)L_{cls}(p_i,p_i^*) + \sum_i c_i\log c_i\right) + \lambda\frac{1}{N_{reg}}\sum_i p_i^* L_{reg}(t_i,t_i^*)$$

wherein $N_{reg}$ and $N_{cls}$ denote the number of the estimated ROIs, $c_i$ denotes an i-th CNN confidence score, corresponding to an i-th estimated ROI selected from the estimated ROIs, among the CNN confidence scores, $p_i$ denotes an i-th estimated CNN classification result corresponding to the i-th estimated ROT, $p_i^*$ denotes an i-th GT CNN classification result corresponding to the i-th pixel, $t_i$ denotes an i-th estimated CNN regression result corresponding to the i-th estimated ROI, and $t_i^*$ denotes an i-th GT CNN regression result corresponding to the i-th pixel, and wherein the i-th estimated CNN classification result and the i-th estimated CNN regression result correspond to the estimated object detection result.

25. The device of claim 22, wherein, after the process of (I3), the learning device instructs a confidence layer to generate an integrated confidence map including information on each of integrated confidence scores for each of pixels in the training image by referring to the RPN confidence map and the CNN confidence map.

26. The device of claim 25, wherein the learning device instructs the confidence layer to perform (i-1) a process of acquiring a Non-Maximum Suppression (NMS) result on the estimated ROIs generated during a process of generating the estimated object detection result, from the CNN, (i-2) a process of generating a resized RPN confidence map by applying at least one resizing operation to the RPN confidence map, and (ii) a process of generating the integrated confidence map by referring to the NMS result and the resized RPN confidence map.

27. The device of claim 26, wherein the learning device instructs the confidence layer to generate an (X_Y)-th integrated confidence score, corresponding to a coordinate (x,y) on the training image, among the integrated confidence scores, by using a following formula:

$$c'_{xy} = \max\left(c_{xy}, \max_{r_i:(x,y)\in r_i} c_{r_i}\right)$$

wherein $c_{xy}'$ denotes the (X_Y)-th integrated confidence score, $c_{xy}$ denotes an (X_Y)-th resized RPN confidence score corresponding to a coordinate (x,y) on the resized RPN confidence map, and $c_{r_i}$ denotes an i-th CNN confidence score for an i-th estimated ROI, denoted as $r_i$, including the coordinate (x,y), which has been determined in the NMS result.

28. A computing device for achieving better performance in an autonomous driving while saving computing powers, by using confidence scores representing a credibility of an object detection which is generated in parallel with an object detection process, comprising:

at least one memory that stores instructions; and
at least one processor configured to execute the instructions to perform processes of:
(I) acquiring at least one circumstance image on surroundings of a subject vehicle, through at least one panorama view sensor installed on the subject vehicle;
(II) instructing a Convolutional Neural Network (CNN) to apply at least one CNN operation to the circumstance image, to thereby generate initial object information and initial confidence information on the circumstance image; and
(III) generating final object information on the circumstance image by referring to the initial object information and the initial confidence information;

wherein the process of (II) further includes processes of:
(II1) if the circumstance image is acquired, instructing at least one convolutional layer included in the CNN to generate at least one convolutional feature map by applying at least one convolutional operation to the circumstance image;
(II2) during a process of generating estimated Regions-Of-Interest (ROIs) on the circumstance image by applying at least one anchor operation to the convolutional feature map, instructing at least one anchor layer included in a Region Proposal Network (RPN) to generate each of one or more RPN confidence scores for each of pixels in the convolutional feature map, representing each of one or more probabilities of the estimated ROIs being same as Ground-Truth (GT) ROIs, to thereby generate an RPN confidence map including the RPN confidence scores;
(II3) if at least one ROI-Pooled feature map is acquired, which has been generated by using the convolutional feature map and the estimated ROIs through an ROI pooling layer included in the CNN, during a process of generating an estimated object detection result by using the ROI-Pooled feature map, instructing an FC layer included in the CNN to generate each of CNN confidence scores for each of the estimated ROIs, representing each of one or more probabilities of each of one or more estimated CNN classification results and each of one or more estimated CNN regression results included in the estimated object detection result being same as each of one or more GT CNN classification results and each of one or more GT CNN regression results included in a GT object detection result, to thereby generate a CNN confidence map including the CNN confidence scores; and
(II4) instructing a confidence layer interworking with the CNN to generate an integrated confidence map by referring to the RPN confidence map and the CNN confidence map, wherein the processor instructs the CNN to output the initial object information including the estimated object detection result and the initial confidence information including the integrated confidence map.

* * * * *